3,050,567
POLYCYCLIC COMPOUNDS CONTAINING NUCLEARLY SUBSTITUTED HALOGENS
Louis Schmerling, Riverside, Ill., assignor, by mesne assignments, to Universal Oil Products Company, Des Plaines, Ill., a corporation of Delaware
No Drawing. Filed Mar. 29, 1954, Ser. No. 419,626
7 Claims. (Cl. 260—648)

This application is a continuation-in-part of my copending application Serial No. 100,755, filed June 22, 1949, now abandoned.

This invention relates to novel cyclic organic compounds containing chlorine in their structure and useful as chemical intermediates and as toxicants in insecticidal formulations. More specifically, the invention concerns chlorine-containing cyclic compounds formed by a particular process involving the controlled condensation of hexahalocyclopentadiene with olefinic hydrocarbons and to insecticidal compositions containing said compounds.

This invention provides a series of compounds characterized generally as polycyclic compounds containing multiple nuclear halogen substituents. The present compounds are of tricyclic structure, formed by the condensation of a cyclic mono-olefin with hexahalocyclopentadiene at reaction conditions which result in the formation of an adduct between the reactants. The resulting condensation products have the following empirical formula:

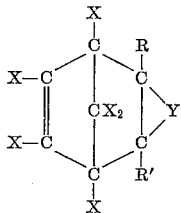

wherein R and R' are selected from the group consisting of hydrogen and alkyl groups, X is a halogen radical selected from chloro and bromo, and Y is a divalent saturated hydrocarbon radical (an alkylene group) having at least 3 carbon atoms in the chain, such as trimethylene (—CH$_2$CH$_2$CH$_2$—), tetramethylene (—CH$_2$CH$_2$CH$_2$—), methyltetramethylene (—CH$_2$CH$_2$CH(CH$_3$)CH$_2$—), etc.

Thus, in its broad aspects this invention concerns tricyclic nuclearly halogen-substituted compounds of the following structure:

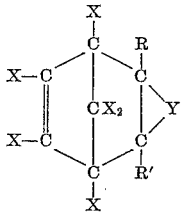

wherein R and R' are selected from the group consisting of hydrogen and alkyl groups, X is a halogen selected from bromo and chloro, and Y is a divalent, saturated hydrocarbon radical having at least 3 carbon atoms in a chain.

Other embodiments of the invention relate to the process for preparing tricyclic, nuclearly halogen-substituted compounds which comprises reacting a hexahalocyclopentadiene, in which the halogen substituents are selected from chloro- and bromo- with a cyclo-olefinic hydrocarbon containing from 5 to about 7 carbon atoms in its carbocyclic ring at condensation reaction conditions, preferably at a temperature of from about 100° to about 200° C., at a pressure sufficient to maintain the reactants in substantially liquid phase, and utilizing a molar ratio of said cyclo-olefin to hexahalocyclopentadiene greater than 1 to 1.

The production of the present polycyclic, chlorine-containing compounds is effected by the controlled thermal condensation of a hexahalocyclopentadiene with a cyclomono-olefinic hydrocarbon at reaction conditions which result in the formation of an adduct of the Diels-Alder type, the resulting adduct being a tricyclic polyhalogen-substituted compound containing a single olefinic bond in the condensed carbocyclic rings. The reaction is believed to proceed in accordance with the following reaction mechanism, although it is not intended to restrict the scope of this invention necessarily to reactions and compositions complying with such specific mechanism:

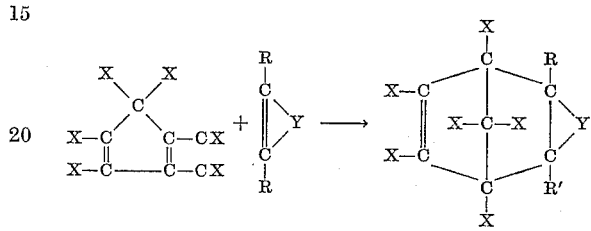

wherein Y is a divalent alkylene radical containing at least 3 and up to about 5 carbon atoms in the chain, X is a halogen substituent selected from chloro and bromo, and R and R' are selected from hydrogen and alkyl. The fact that the present condensation reaction occurs to any appreciable extent is surprising in view of statements in the prior art, (viz., Advanced Organic Chemistry, Reynold C. Fuson, Wiley & Sons, Inc., 1950, page 63 and in a paper by Bergmann and Weizmann, J. Org. Chem., 9, 352 (1944)) that cyclohexenes do not act as dienophiles in the Diels-Alder condensation reaction. Thus, for example, in spite of the use of the extremely reactive diene, bicyclohexenyl, cyclohexene was found by Bergmann and Weizmann to undergo no condensation with the aforementioned diene. However, contrary to the anticipated inertness of cyclo-olefins in condensation reactions with dienes in accordance with the general experience of the art, it has now been found that condensation reactions of this type do in fact occur, accompanied by an appreciable yield of product, when the reaction involved is between the cyclo-olefins and a hexahalocyclopentadiene.

Although hexachlorocyclopentadiene is preferred in the present process as the dienic reactant, because of its availability in commercial quantities and because of the highly effective insecticidal properties of its condensation products with mono-olefin hydrocarbons, hexabromocyclopentadiene or mixed bromo- and chloro-substituted hexahalocyclopentadiene may be likewise utilized in the reaction to provide bromine-containing polycyclic compounds having molecular structures similar to the corresponding condensation product of hexachlorocyclopentadiene with a cyclomono-olefinic hydrocarbon. Also, perhaloalkylcyclopentadienes (for example, 1-trichloromethyl - 2,3,4,5,5 - pentachloro - 1,3-cyclopentadiene) may be used.

Cyclomono-olefin hydrocarbons utilizable in the present condensation reaction with hexahalocyclopentadienes are selected from those containing at least 5, generally up to about 7, carbon atoms in the ring, including cyclopentene, cyclohexene, cycloheptene, 4-methylcyclopentene, 4-ethylcyclohexene, 5-sec-butylcyclohexene, 1-methyl-4-isopropyl-1-cyclohexene, 3,3,6,6-tetramethylcyclohexene, etc. Although carbon atoms constituting the ethylenic linkage in the carbocyclic ring may be substituted by an alkyl group, it is preferred that such alkyl substituent contain no more than about 3 carbon atoms because of the decreasing reactivity of higher molecular weight olefins. These cyclo-olefins may be supplied to the reaction in their substantially chemically pure form as concentrates thereof, or in admixture with paraffins and naphthenes containing the desired cyclo-olefins, such as a fraction of petroleum or a conversion product thereof. Furthermore, a mixture of cyclo-olefins comprising two or more individuals may be utilized in the reaction.

The condensation reaction provided herein is effected at a temperature of from about 100° to about 250° C., preferably at a temperature of from about 150° to about 200° C., and at a superatmospheric pressure generally in excess of about 2 atmospheres and preferably from about 10 to about 100 atmospheres. In conducting the reaction, it is an essential factor that the rate of applying heat to the reaction mixture be rigidly controlled in order to obtain a significant yield of the resulting condensation product. The product in the case of an indiscriminately heated reaction mixture in which the exothermic heat of the condensation reaction introduces an additive effect in the rate of temperature increase in the reaction mixture, consists predominantly of carbonaceous material, indicating substantial decomposition of one or more of the reactants and/or products during the development of the high temperatures in the reaction mixture. Observations have shown that the rate of increasing the temperature of the mixture of reacting components in the generally critical temperature range of from about 120° to about 200° C., during which the rate of the condensation reaction is greatest, must be maintained at from about 0.1 to about 2.0 degrees per minute, and preferably at a rate of from about 0.3 to about 0.7 degree per minute. In isolated instances, as, for example, when utilizing a relatively less reactive olefinic hydrocarbon which condenses with the hexahalocyclopentadiene reactant at a slower rate, the reaction mixture may be desirably heated at a higher rate than indicated above. Also, higher rates of heating may be employed if an inert diluent is used or if a means of efficiently removing the exothermic heat of reaction is supplied. Although an approximately equimolecular ratio of the reactants may be utilized to effect an almost quantitative conversion to the desired condensation product, it is preferred to maintain the proportion of the olefinic hydrocarbon component to the hexahalocyclopentadiene reactant in the reaction at a somewhat higher than equimolecular ratio thereof, from about 1.5 to 1 to about 10 to 1, in order to consume the hexahalocyclopentadiene reactant substantially to completion during the reaction. The excess of the mono-olefinic hydrocarbon reactant provides an effective diluent of the reaction mixture, enabling the rate of the resulting exothermic reaction to be controlled within the desired limits. In thus substantially removing the hexahalocyclopentadiene component from the reaction mixture by virtue of its condensation with the olefinic hydrocarbon reactant, the subsequent problem of separating the product from the reaction mixture is simplified, since the excess of monoolefin, usually the most volatile component of the reaction mixture, may be recovered therefrom by merely distilling the same from the mixture, leaving a residue consisting predominantly of the product. The latter residue may thereafter be further purified, for example, by recrystallization, extraction, fractional distillation, or by other means well known to the art, or utilized directly without further purification for the preparation of an insecticidal composition therefrom.

The physical properties of the present condensation products and the effect they have on entomological forms of life make them particularly desirable as insecticides and insect repellants. The combination of properties the present products exhibits indicate their applicability as insecticides in that they provide many of the features desired of compounds for this purpose. They are, for example, highly toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporation of the applied compounds therefrom retain none of the insecticide to limit the use of the plant for food purposes. On the other hand, the compounds are of sufficiently limited volatility to be retained on the insect for the time required to accomplish the toxic effects of the compound. The volatility and retentive capacity of the compound may be varied at will by combining them with suitable fixing agents which reduce or promote their volatilization, as desired. Thus, the compounds may be dissolved in a liquid solvent of suitable boiling point, such as a mineral or vegetable oil, petrolatum, etc. a wax, such as paraffin wax, beeswax, etc., a high molecular weight alcohol or ether such as myricyl alcohol, dibutyl ether, etc. or they may be emulsified with water or combined with an oil and emulsified with water by the addition of an emulsifying agent to a water and oil mixture thereof. The latter solvents and dispersants may also be employed for the specific purpose of reducing the concentration of insecticide to a desirable formulation. The compounds, for example, may be formulated into compositions containing the active component in a concentration sufficient to take advantage of its maximum efficacy which at certain optimum concentrations has the desired toxic effect. The particular formulation of active components in combination with the solvent or dispersant will depend upon its application. Compositions containing as high as 20% of active component may be preferred in some instances where deep penetration of the insecticide is desired, as in the treatment of fibrous material, such as wood, for extinction of a particular infestation, such as wood termites. For other purposes, the required concentration of active components in the formulation may be as low as about 0.1%, as for example, in the treatment of fabrics for destroying moth larvae. In general, for use of the present insecticidal compounds against most insects, a composition containing from about 1% to about 5% by weight of the active component is highly effective. The choice of the most suitable solvent or dispersant further depends upon the method utilized to apply the composition to the infested article. For example, a lower molecular weight, normally gaseous carrying agent for the active component, such as butane, Freon, etc. may be compressed and liquefied into a small bomb containing the insecticidal compound. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, etc., and the resultant solution atomized by a suitable spraying device.

The insecticidal properties of the compounds of the present invention may be modified by subjecting them to subsequent additional reactions such as nitration, hydrogenation, hydroxylation, hydrohalogenation, (particularly, hydrochlorination), halogenation (particularly chlorination), etc.

This invention is further described with reference to the following illustrative examples which, although indicative of typical representative compounds of the present process are nevertheless not intended to limit the generally broad scope of the invention in strict accordance therewith.

EXAMPLE I

A 65% yield of proudct, 1,2,3,4,9,9-hexachloro-1,4,4a, 5,6,7,8,8a-octahydro-1,4-methano-naphthalene was obtained by the condensation of hexachlorocyclopentadiene with cyclohexene, in accordance with the following experiment.

A mixture of 42 grams of hexachlorocyclopentadiene and 40 grams of cyclohexene were heated together at 180° C., and at 50 atmospheres pressure of added nitrogen in a rotating pressure autoclave during a period of approximately 1 hour and maintained at said temperature of 180° C. for an additional 6 hours to complete the condensation reaction. The crude product weighed 66 grams and upon distillation at a pressure of 3 mm. mercury absolute, the following fractions were obtained: (1) 17 grams of material boiling below about 30° C. and consisting substantially of cyclohexene; (2) an intermediate fraction consisting of 0.5 cc. boiling from about 70° to about 165° C. at 3 mm. mercury pressure; (3) 5.1 grams of material having a boiling point range of 165° C. to 171° C. at 3 mm. mercury pressure and refractive index of 1.5621; (4) 30.3 grams of material having a boiling point of 171–173° C. at 3 mm. pressure, a refractive index of 1.5663, and a melting point of 74–76° C.; a bottoms residue amounting to 10 grams was recovered, being partly soluble in benzene and insoluble in alcohol.

The fraction boiling from 171 to 173° C. and having a melting point of 74–76° C., comprising the primary product of the above condensation reaction is believed to consist almost entirely of pure 1,2,3,4,9,9-hexachloro-1,4,4a,5,6,7,8,8a-octahydro-1,4-methanonaphthalene, having the following structural formula:

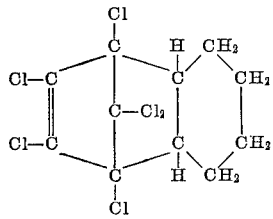

It was analyzed, the analysis indicating the following components in the following proportions: C, 37.22; H, 3.11; Cl, 59.68. Calculated values for $C_{11}H_{10}Cl_6$ are: C, 37.22; H, 2.84; Cl, 59.94.

The above product was dissolved in benzene, the resulting solution was emulsified with water and the resulting formulation tested for its insecticidal activity against houseflies and other insects. It was found to give 100% kill of houseflies in 0.1% dilution. It gave 100% kill of Mexican bean beetles in 1% dilution and was also highly effective against pea aphids, red spider mites, 2-spotted mites, etc.

*Example II*

The hexachloro-octahydromethanonaphthalene product of Example I was also obtained when a mixture of the hexachlorocyclopentadiene (60 grams) and cyclohexene (16.5 g.) was heated under reflux for 12 hours. The temperature of the refluxing mixture gradually rose to a high of 155° C. at the end of the reflux period. Distillation of the product yielded 28 g. (40% of the theoretical) of product boiling at 124–140° C. at 0.3 mm. pressure and having a refractive index of 1.5630–1.5640, which crystallized on cooling to room temperature. Recrystallization from methanol yields crystals melting at 78° C.

*Example III*

A product characterized as 4,5,6,7,8,8-hexachloro-2,3,3α,4,7,7α-hexahydro-4,7-methanoindene, which may also be characterized as 4,5,6,7,8,8-hexachloro-4,7-methylene-3a,4,7,7a-tetrahydroindane, and having the following structure:

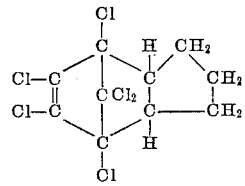

is formed by condensing cyclopentene with hexachlorocyclopentadiene, utilizing a molar proportion of cyclo-olefin to diene of 2.5 to 1, and effecting the condensation at a temperature of 190° C. by heating the mixture of reactants in a rotating pressure autoclave for a period of 8 hours as the autoclave is slowly rotated. The mixture is maintained in substantially liquid phase by charging nitrogen into the autoclave reactor at a pressure of 200 p.s.i.

Upon distillation of the reaction mixture under vacuum a fraction corresponding to the boiling point of the excess dimethylcyclopentene reactant is separated initially, followed by an intermediate fraction representing a major portion of the reaction product which crystallizes upon cooling to a white crystalline material.

*Example IV*

A Diels-Alder condensation product having the structure:

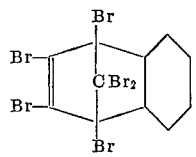

that is, 5,6-pentamethylene-1,2,3,4,7,7-hexabromobicyclo [2.2.1]-2-heptene is formed by reacting cycloheptene (formed by dehydration of cycloheptanol over activated alumina) with hexabromocyclopentadiene, the reaction being effected by a thermal condensation of the Diels-Alder type. The condensation occurs when a mixture of the reactants is heated in a pressure autoclave at a temperature of 195° C. for a period of 10 hours, the reaction mixture being maintained in substantially liquid phase by charging nitrogen into the autoclave at a pressure of 20 atmospheres. In order to force the reaction to completion, a molar excess of 3 moles cycloheptene per mole of the cyclo-olefin being separated from the reaction mixture by distillation at the end of the above period.

I claim as my invention:

1. A Diels-Alder adduct of a hexahalocyclopentadiene and a cycloolefin, said adduct having the following empirical structure:

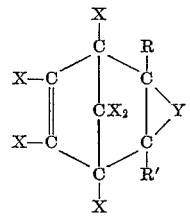

wherein R and R' are selected from the group consisting of hydrogen and alkyl groups, X is a halogen selected from the group consisting of chloro and bromo, and Y is a divalent polymethylene radical containing at least 3, up to about 5, carbon atoms in the chain.

2. 1,2,3,4,9,9-hexahalo-1,4,4a,5,6,7,8,8a-octahydro-1,4-methanonaphthalene, said compound being the Diels-Alder adduct of a hexahalocyclopentadiene and cyclohexene.

3. 4,5,6,7,8,8 - hexahalo - 2,3,3a,4,7,7a - hexahydro-4,7-methanoindene, said compound being the Diels-Alder adduct of a hexahalocyclopentadiene and cyclopentene.

4. 5,6 - pentamethylene - 1,2,3,4,7,7 - hexahalobicyclo [2.2.1]-2-heptene, said compound being the Diels-Alder adduct of a hexahalocyclopentadiene and cycloheptene.

5. 1,2,3,4,9,9 - hexachloro - 1,4,4a,5,6,7,8,8a - octahydro-1,4-methanonaphthalene, said compound being the Diels-Alder adduct of hexachlorocyclopentadiene and cyclohexene.

6. 1,2,3,4,9,9 - hexachloro - 1,4,4a,5,6,7,8,8a - octahydro-1,4-methanonaphthalene, melting at about 76° C.

7. 4,5,6,7,8,8 - hexachloro - 4,7 - methylene - 3a,4,7,7a-tetrahydroindane, said compound being the Diels-Alder adduct of hexachlorocyclopentadiene and cyclopentene.

References Cited in the file of this patent

UNITED STATES PATENTS

| | | |
|---|---|---|
| 2,635,979 | Lidov | Apr. 21, 1953 |
| 2,676,132 | Bluestone | Apr. 20, 1954 |
| 2,724,730 | Johnson | Nov. 22, 1955 |